(12) United States Patent
Sorelius et al.

(10) Patent No.: US 6,411,257 B1
(45) Date of Patent: Jun. 25, 2002

(54) ANTENNA ANGLE-OF-ARRIVAL ESTIMATION USING UPLINK WEIGHT VECTORS

(75) Inventors: Joakim Sorelius, Uppsala; Bo Göransson, Stockholm; Mats Cedervall, Täby, all of (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/510,594

(22) Filed: Feb. 22, 2000

(51) Int. Cl.[7] .............................. G01S 3/16; G01S 3/28
(52) U.S. Cl. ..................... 342/378; 342/417; 455/456
(58) Field of Search ............................. 342/417, 378; 455/456

(56) References Cited

U.S. PATENT DOCUMENTS 4,965,732 A * 10/1990 Boy, III et al. ............. 342/147
6,047,192 A * 4/2000 Maloney et al. ............ 455/456

OTHER PUBLICATIONS

EPO Standard Search Report No. RS 104644 dated Jul. 31, 2000.

Alle–Jan van der Veen, PATO course on Signal Processing for Communications, The Netherlands, Sep. 1996.

* cited by examiner

Primary Examiner—Theodore M. Blum
(74) Attorney, Agent, or Firm—Jenkens & Gilchrist, P.C.

(57) ABSTRACT

The angle at which a multipath finger produced by a digital radio communication source arrives at an antenna array can be estimated using an uplink weight vector associated with the multipath finger. Due a characteristic of uplink weight vectors used in antenna arrays having a shift invariance structure, the estimate of the angle can be calculated based on the uplink weight vector.

24 Claims, 8 Drawing Sheets

US 6,411,257 B1

ANTENNA ANGLE-OF-ARRIVAL ESTIMATION USING UPLINK WEIGHT VECTORS

FIELD OF THE INVENTION

The invention relates generally to the use of adaptive antenna arrays in digital radio communications and, more particularly, to angle-of-arrival (AOA) estimation for downlink use in such adaptive antenna arrays.

BACKGROUND OF THE INVENTION

In array signal processing of digital communications, an array of receive and transmit antennas is deployed in the base station (e.g. in a cellular telephone network) to combat interference and in that way increase capacity and performance of the system. There are two main concepts for exploiting the potential performance gain from an antenna array.

One approach is to use the antenna to form a number of fixed beams in the uplink. The receiver algorithm then uses the output from one or more beams to receive a desired user. In the downlink, the data is then transmitted in the beam with the highest signal-to-noise ratio (SNR), or in several beams in the case of transmit diversity systems.

Another possibility is to steer a narrow beam directly towards a desired mobile. This can be done in two fundamentally different ways.

In a parametric approach, the angles-of-arrival of the multipaths (fingers) of the desired user are explicitly estimated, and the uplink beams are then steered in the determined direction. The AOA giving the highest SNR is then used for the downlink transmission. Again, in the case of transmit diversity, several downlink beams can be utilized.

In a non-parametric approach, the AOAs of the desired user are not estimated explicitly, but only the spatial channels (or spatial signatures) are estimated, giving rise to an estimated array weight vector (obtained for example using a vector RAKE receiver) for each finger. The combination of these weights applied to the array output yields the signal used to receive the user data. The non-parametric methods do not yield any explicit information on the AOAs for the user, and these AOAs have to be estimated separately.

There is much scientific literature on AOA estimation using adaptive antennas. The interest in AOA estimation was mainly spurred by the advent of the so-called super-resolution algorithms, such as MUSIC, ESPRIT, MODE and WSF, methods that can estimate the AOAs with higher accuracy than the classical beamforming algorithms.

One of the major shortcomings of the popular super-resolution methods is their computational complexity. They often involve performing the singular value decomposition of a matrix the size of the array. Another drawback of these methods is their reported sensitivity to model errors; their ability to give good estimates of the AOAs relies heavily on a parametric model of the signal environment and an accurate calibration of the antenna array.

The non-parametric methods, such as beamforming, basically work by scanning the area covered by the array with a narrow beam and selecting the AOA as the direction giving the highest output power from the array. As such, these methods are more robust, but their bad resolution can be a limiting factor in practice, where many users are present close to each other and where noise levels might be high.

It is desirable in view of the foregoing to provide for AOA estimation without the aforementioned disadvantages of the prior art approaches.

In an attempt to avoid the aforementioned disadvantages of the prior art approaches, the present invention exploits a characteristic of conventionally available uplink weight vectors used in antenna arrays having a shift invariance structure, and calculates AOA estimates directly from the uplink weight vectors.

DETAILED DESCRIPTION

The present invention draws upon the fact that, for some antenna array structures, the components of the estimated weight vector for one multipath finger are approximately (neglecting the effect of noise and errors in the estimation of the weight vector) related by a simple phase shift. This can be seen from the model described below.

Figure 1:
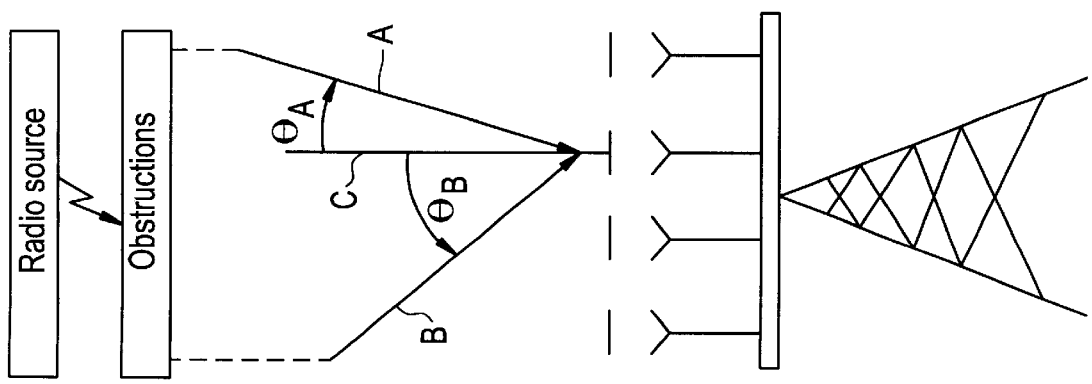
FIG. 1 diagrammatically illustrates the angular relationship between an antenna normal vector of an antenna sensor and two multipath fingers resulting from a single digital radio communication source.

FIG. 1 diagrammatically illustrates the angular relationship of two exemplary multipath fingers A and B to the antenna normal vector C of a sensor in an antenna array. The multipath fingers A and B are the well-known result of various physical obstructions (buildings, hills, etc.) which re-direct a radio signal produced by a radio source, for example a digital cellular telephone. The angle between multipath finger A and the antenna normal vector C is designated in FIG. 1 as $\theta_A$, and the angle between multipath finger B and the antenna normal vector C is designated as $\theta_B$.

Figure 2:
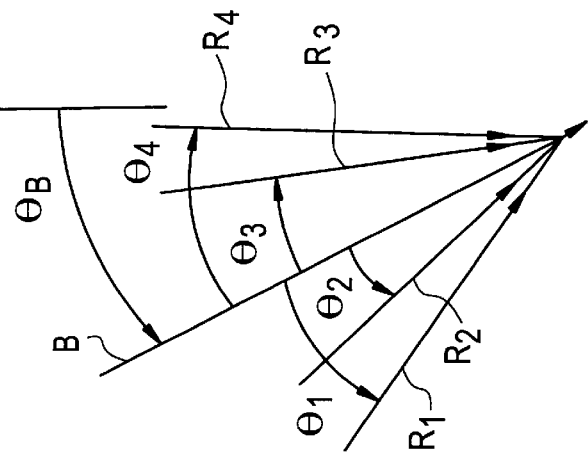
FIG. 2 diagrammatically illustrates how a multipath finger can be modeled as a large number of arrays impinging from different angles.

Each multipath finger can be assumed to have some angular spread around its nominal direction of propagation. For example, FIG. 2 illustrates that multipath finger B can be modeled as a large number of rays, four of which are illustrated in FIG. 2. The illustrated rays $R_1$–$R_4$ impinge upon the multipath finger B from respective angles $\theta_1$–$\theta_4$. Thus, each of a large number L of rays (four of which are shown in FIG. 2) impinges from a separate angle $\theta_l$, for l=1 to L. Each of these rays also has a complex amplitude designated herein as $h_l(t, \theta_l)$. Each of the angles $\theta_l$ can be modeled as a random variable with mean $\theta_B$ and variance $\sigma_l^2$. Using these assumptions, the weight vector for a given multipath finger can be written as follows:

$$w(t, \theta) = \sum_{l=1}^{L} h_l(t, \theta_l) a(\theta_l) + E(t) \quad \text{Equation 1}$$

The variable θ on the left side of Equation 1 represents the angle of arrival of the particular multipath finger. Thus, for multipath finger B of FIGS. 1 and 2, the variable θ on the left side of Equation 1 corresponds to $\theta_B$ of FIGS. 1 and 2.

Figure 3:
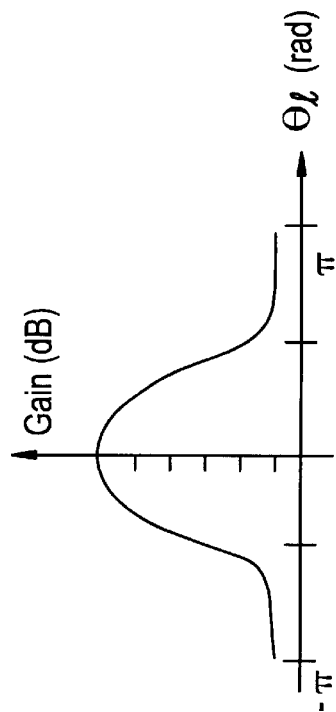
FIG. 3 graphically illustrates the angular dependency of antenna gain.

In Equation 1, $h_l(t, \theta_l)$ denotes the base band channel for ray l at time t. As is well known in the art, this base band channel includes the effect of propagation attenuation, receiver filtering and pulse shaping. Also, the antenna gain, which depends on the angle $\theta_l$ (see FIG. 3) is included in the base band channel $h_l(t, \theta_l)$.

Figure 4:
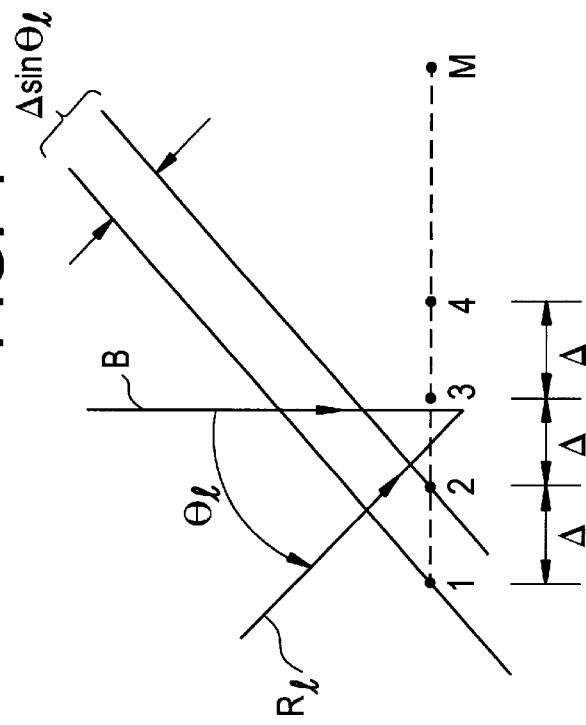
FIG. 4 diagrammatically illustrates the propagation delay between sensors of a uniform and linear antenna array.

The factor $a(\theta_l)$ in Equation 1 accounts for the effect of the time delay as the wave propagates through the array. As shown in FIG. 4, the propagation time delay corresponds to the time necessary for the wave corresponding to ray $R_1$ to travel the distance $\Delta \sin\theta_l$.

The term E(t) in Equation 1 is due to the fact that the weight vector is estimated in a noisy environment, using a finite number of training symbols.

For narrow-band signals, for example digital radio communication signals, a time delay corresponds to a phase shift. In Equation 1, $a(\theta_l)$ is a vector of these phase shifts called an array response vector. In the example of FIG. 4, the antenna array is a conventional uniform and linear array (ULA) including M sensors 1, 2, 3 . . . M. In this example, the M-dimensional array response vector $a(\theta_l)$ is given by $$a(\theta_l) = \begin{bmatrix} 1 \\ e^{i\Delta \sin\theta_l} \\ e^{2i\Delta \sin\theta_l} \\ \vdots \\ e^{(M-1)i\Delta \sin\theta_l} \end{bmatrix} \quad \text{Equation 2}$$

The M components of this vector respectively correspond to the M sensors in the ULA of FIG. 4.

If the angular spread between θ and each $\theta_l$ (see also FIG. 2) is small, for example 3° to 10°, a Taylor series expansion of $a(\theta_l)$ around $\theta_l = \theta$ yields $$w(t, \theta) = \sum_{l=1}^{L} h_l(t, \theta_l) \left( a(\theta) + a'(\theta - \theta_l) + \frac{1}{2} a''(\theta)(\theta - \theta_l)^2 + \ldots \right) + E(t)$$

$$= h(t, \theta) a(\theta) + \sum_{l=1}^{L} h_l(t, \theta_l) \left( a'(\theta)(\theta - \theta_l) + \frac{1}{2} a''(\theta)(\theta - \theta_l)^2 + \ldots \right) +$$

$$E(t)$$

$$= h(t, \theta) a(\theta) + n(t)$$

where $$h(t, \theta) = \sum_{l=1}^{L} h_l(t, \theta_l).$$

Because $\theta - \theta_l$ is small on average (much less than 1 in radians), it can be seen from Equation 3 that the part of n(t) other than E(t) (i.e., the summation portion) is small on average.

Referring again to the example of FIG. 4, the ULA illustrated therein is an example of an antenna array having a shift invariance structure. This means that each of the sensors 1, 2, . . . M is spaced a distance Δ wavelengths apart from its neighboring sensors, and that the array includes two identical sub-arrays. For example, a first sub-array could be defined by the sensors, 1, 2 and 3 of FIG. 4, and a second sub-array could be defined by the sensors 2, 3 and 4. The conventional uplink weight vector associated with the antenna of FIG. 4 includes M components which respectively correspond to the M sensors. Analogously, the weight vector for a given sub-array is a sub-vector of the M-dimensional weight vector, including a plurality of (less than M) components which respectively correspond to the sensors of the sub-array. Accordingly, sub-vectors $w_1$ and $w_2$ respectively associated with first and second sub-arrays can, from Equations 1 and 3 above, be expressed as:

$$w_1(t,\theta) = h(t,\theta) a_1(\theta) + n_1(t) \quad \text{Equation 4}$$

$$w_2(t,\theta) = h(t,\theta) a_2(\theta) + n_2(t) \quad \text{Equation 5}$$

wherein $a_1(\theta)$ represents an array response sub-vector of the array response vector $a(\theta)$ including those components of $a(\theta)$ corresponding to the sensors of the first sub-array, and $a_2(\theta)$ is similarly an array response sub-vector including those components of $a(\theta)$ corresponding to the sensors of the second sub-array. Similarly, $n_1(t)$ includes the components of $n_2(t)$ associated with the sensors of the first sub-array, and $n_2(t)$ represents the components of n(t) associated with the second sub-array.

In antenna arrays having a shift invariance structure, for example the ULA of FIG. 4, the array response sub-vectors of first and second sub-arrays are known to be related as follows:

$$a_2(\theta) = e^{i2\pi\Delta \sin\theta} a_1(\theta) \quad \text{Equation 6}$$

Substituting Equation 6 into Equation 5 yields the following:

$$w_2(t,\theta) = h(t,\theta) a_1(\theta) e^{i2\pi\Delta \sin\theta} + n_2(t). \quad \text{Equation 7}$$

Now, a comparison of Equations 7 and 4 yields:

$$w_2(t,\theta) = w_1(t,\theta) e^{i2\pi\Delta \sin\theta} + \tilde{n}(t) \quad \text{Equation 8}$$

where $\tilde{n}(t)$ is a modified noise term with mean zero.

Equation 3

Equation 8 can be solved for θ in many different ways, given a sample of weight vectors $\{w_1(t,\theta), w_2(t,\theta)\}$, t=1 to N. The most straightforward example is the least-squares (LS) method described below.

Multiplying the left and right sides of Equation 8 with $w_1^H(t)$ (where H denotes the complex conjugate transpose operator) and summing over the available samples (neglecting $\tilde{n}(t)$) yields:

$$\sum_{t=1}^{N} w_1^H(t)w_2(t) = \sum_{t=1}^{N} w_1^H(t)w_1(t)e^{i2\pi\Delta\sin\theta} \quad \text{Equation 9}$$

(the dependence on θ in the notation is dropped here for simplicity). Rearranging Equation 9 produces $$e^{i2\pi\Delta\sin\theta} = \left[\sum_{t=1}^{N} w_1^H(t)w_1(t)\right]^{-1}\left[\sum_{t=1}^{N} w_1^H(t)w_2(t)\right] \quad \text{Equation 10}$$

which can be readily solved for the angle of arrival θ of the multipath finger (for example $\theta_B$ of FIGS. 1 and 2). The solution of Equations 9 and 10 is conventionally referred to as the "least-squares" solution because it minimizes the following criterion:

$$\sum_{t=1}^{N} |w_2(t,\theta) - w_1(t,\theta)e^{i2\pi\Delta\sin\theta}|^2 \quad \text{Equation 11}$$

In practical situations the angle-of-arrival θ of a given multipath component varies slowly with time. Then a recursive implementation of the algorithm is preferred. Below is described a recursive least-squares (RLS) method to estimate θ. Note however that the invention is in no way limited to the RLS method, and that other types of recursive solutions are possible, such as least-mean-squares (LMS), Kalman filter or Newton type implementations. To derive the RLS solution to the problem, let $\alpha(t)=e^{i2\pi\Delta\sin\theta(t)}$. According to the above discussion, an estimate of α(t) (including a forgetting factor μ) is given by $$\alpha(t) = \left(\sum_{s=1}^{t} \mu^{t-s}w_1^H(s)w_1(s)\right)^{-1}\left(\sum_{s=1}^{t} \mu^{t-s}w_1^H(s)w_2(s)\right)^{-1} \quad \text{Equation 12}$$

Introduce the covariance matrix $$P(t) = \left(\sum_{s=1}^{t} \mu^{t-s}w_1^H(s)w_1(s)\right)^{-1} \quad \text{Equation 13}$$

which clearly satisfies the relation $$P^{-1}(t) = \mu P^{-1}(t-1) + w_1^H(t)w_1(t) \quad \text{Equation 14}$$

From Equations 12 and 13, $$\begin{aligned}\alpha(t) &= P(t)\left(\sum_{s=1}^{t-1}\mu^{t-s}w_1^H(s)w_2(s) + w_1^H(t)w_2(t)\right) \quad \text{Equation 15}\\ &= P(t)(P^{-1}(t-1)\alpha(t-1) + w_1^H(t)w_2(t))\\ &= \alpha(t-1) + P(t)w_1^H(t)w_1(t)\alpha(t-1) +\\ &\quad P(t)w_1^H(t)w_2(t)\\ &= \alpha(t-1) + P(t)w_1^H(t)(w_2(t) + w_1(t)\alpha(t-1))\end{aligned}$$

The complete recursive least-squares (RLS) algorithm, including a forgetting factor μ can now be summarized as follows:

1) Set μ, α(θ), and P(0) (see below for suggestions on how to chose these parameters)
2) for t=1 to N do:

$$\alpha(t)=\alpha(t-1)+K(t)\epsilon(t) \quad \text{Equation 16}$$

where:

$$\epsilon(t)=w_2(t)-w_1(t)\alpha(t-1) \quad \text{Equation 17}$$

and $$K(t)=P(t)w_1^H(t) \quad \text{Equation 18}$$

The scalar P(t) used in Equation 18, is obtained from Equation 14.

Concerning the choices of the user parameters μ, α(0) and P(0), the following exemplary general rules can be given. The forgetting factor μ determines how long memory is used in the estimation, and should be chosen slightly less than 1 (e.g., between 0.95 and 0.99). It can be shown that a given μ corresponds to estimation using Equation 9 with N=2/(1−μ). Thus μ determines how many old samples are used in the estimation.

The initial value α(0) is chosen according to any a priori information that might be available on the AOA of the desired user. If no such information is available, α(0) can be set to 1 (corresponding to θ=0) or any other suitable value.

The initial variance P(0) is chosen in accordance with the level of confidence in the initial estimate α(0). A large P(0) gives large initial variation in the estimate and should be used if it is believed that the initial estimate α(0) is bad (e.g. there is no a priori information on the AOA). An exemplary large value is P(0)=10. On the other hand, if α(0) is believed to be accurate, a small P(0) should be chosen. An exemplary small value is P(0)=0.01.

Depending on the forgetting factor μ, P(t) will converge to different values. If μ is close to one, P(t) will coverage to a small value and tracking will be slow (P(∞)=0 for μ=1 which gives no tracking at all), while a small μ will give a higher value of P(t) which enables a faster tracking of changes in α(t).

It can be seen from the foregoing discussion that the angle of arrival for a given multipath finger can, according to the invention, be readily estimated from the corresponding uplink weight vector for any antenna array having a shift invariance structure, for example a uniform and linear array. Once the angle of arrival has been estimated, this angle of arrival can be used to suitably control operation of the antenna array for downlink communication to the source of the signal whose angle of arrival has been estimated.

Figure 5:
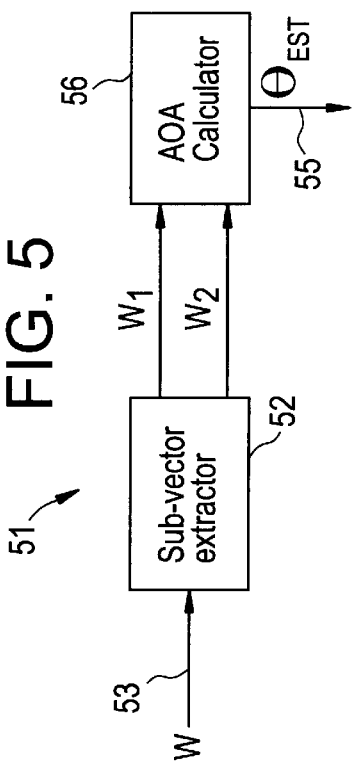
FIG. 5 diagrammatically illustrates exemplary embodiments of an angle of arrival estimator according to the invention.

FIG. 5 diagrammatically illustrates exemplary embodiments of an angle of arrival estimator according to the present invention. The angle of arrival estimator 51 includes an input 53 for receiving information indicative of the uplink weight vector w that has been estimated for a given multipath finger, and an output 55 for providing information indicative of the estimated angle of arrival $\theta_{EST}$. A sub-vector extractor 52 extracts from the weight vector first and second sub-vectors $w_1$ and $w_2$, as discussed above with respect to Equations 4 and 5. These sub-vectors $w_1$ and $w_2$ are provided as input to an angle of arrival calculator 56, which calculates therefrom and outputs the angle of arrival estimate $\theta_{EST}$.

Figure 6:
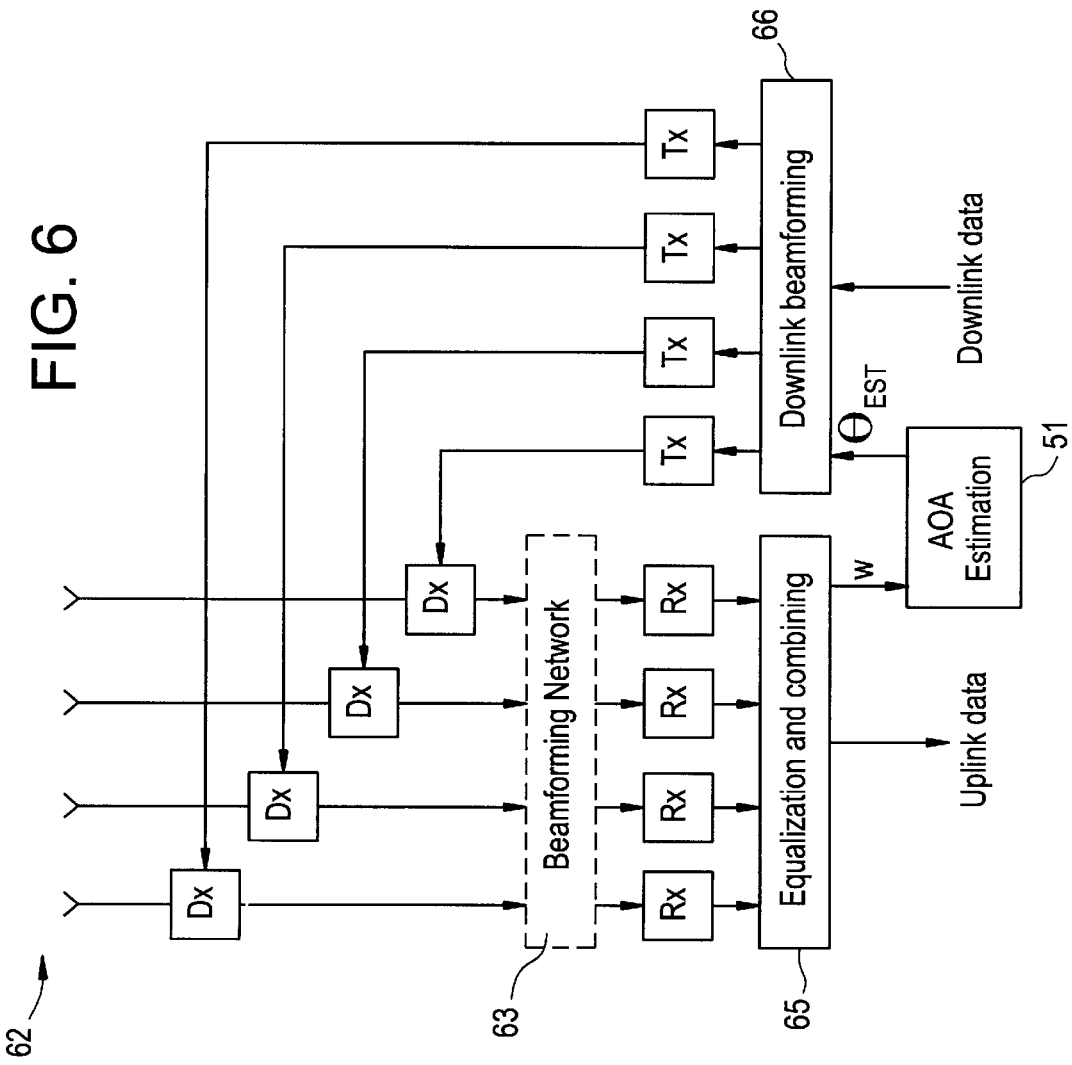
FIG. 6 diagrammatically illustrates an exemplary digital radio communications interface according to the invention.

FIG. 6 illustrates an exemplary digital radio communications interface according to the present invention. The interface of FIG. 6 can be provided, for example, in a base station operating in a digital cellular telecommunications network. As shown in FIG. 6, an antenna array 62 is coupled to duplex (Dx) filters, which, in this example, are in turn coupled to a beamforming network 63. The beamforming network is in turn coupled to receiver (Rx) circuitry, including downconversion circuitry and analog/digital converter circuitry. The receiver circuitry is in turn coupled to an equalization and combining section 65 which provides uplink data to, for example, a data processing section of a base station (not explicitly shown). The section 65 also serves as a weight vector producer that provides the weight vectors w associated with the respective multipath fingers.

The angle of arrival estimator 51 receives the weight vectors, produces the angle of arrival estimates $\theta_{EST}$, and provides these angle of arrival estimates to a downlink beamforming section 66. The downlink beamforming section 66 also receives downlink data from the data processing section. Transmit (Tx) circuitry including digital/analog conversion circuitry, power amplification circuitry and upconversion circuitry is coupled to receive the output of the downlink beamforming section 66, and the output of the transmit circuitry is coupled to the duplex filters. With the exception of the angle of arrival estimator 51 provided according to the present invention, the remaining components illustrated in FIG. 6 are well known in the art.

Figure 7:
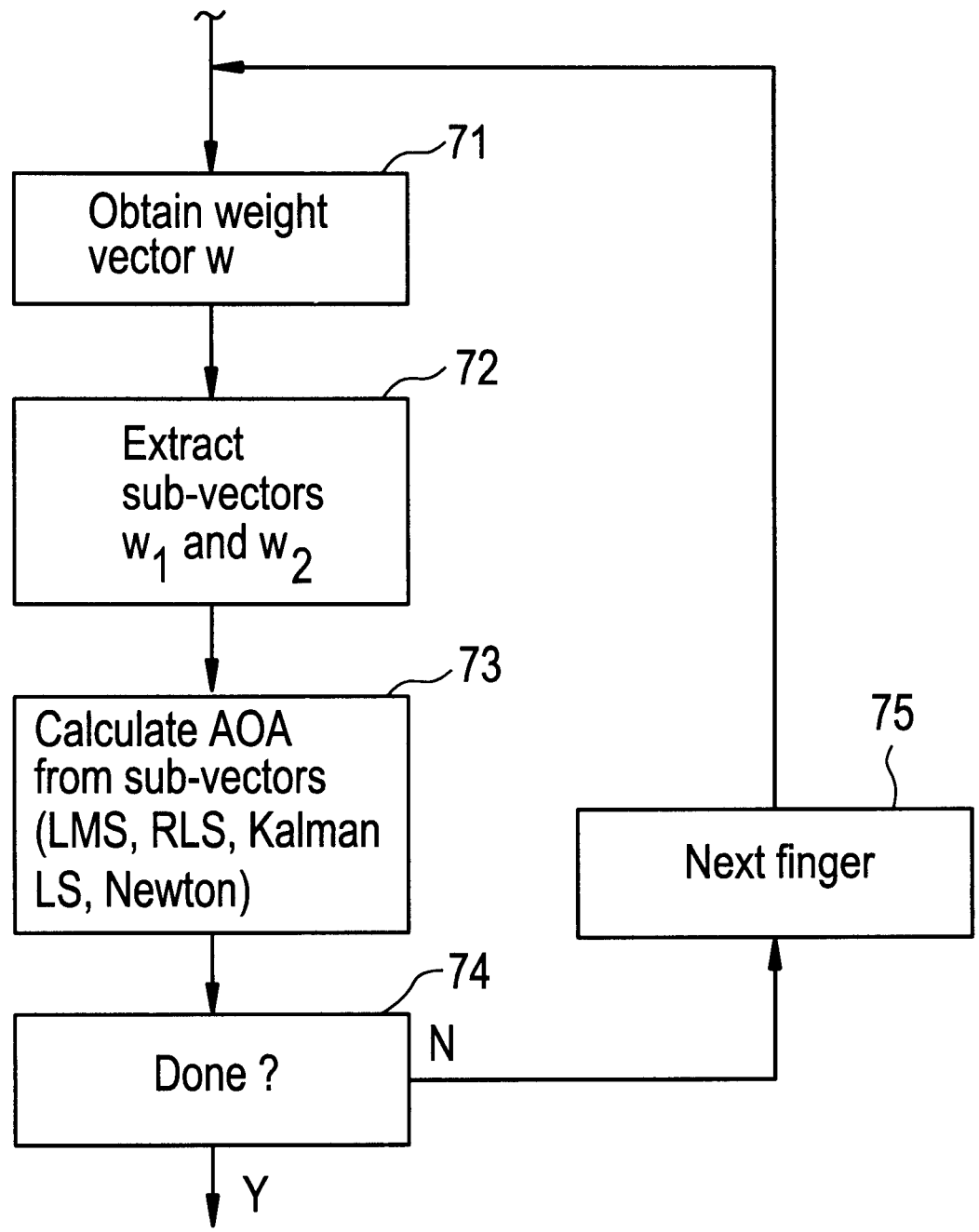
FIG. 7 illustrates exemplary operations which can be performed by the angle of arrival estimator embodiments of FIG. 5.

FIG. 7 illustrates exemplary operations which can be performed by the exemplary angle of arrival estimator of FIG. 5. At 71, the weight vector for a multipath finger is obtained. At 72, sub-vectors corresponding to sub-arrays of the antenna array are extracted from the weight vector. At 73, the angle of arrival estimate is calculated based on the sub-vectors, using any of the above-described exemplary techniques. As indicated at 74 and 75, the procedures at 71–73 can be repeated until all multipath fingers have been processed.

The following link simulations demonstrate the performance of the disclosed angle-of-arrival estimation method. Results are shown both for the least-squares solution of Equations 10–11 and for the recursive implementation of Equations 16–18.

Figure 8:
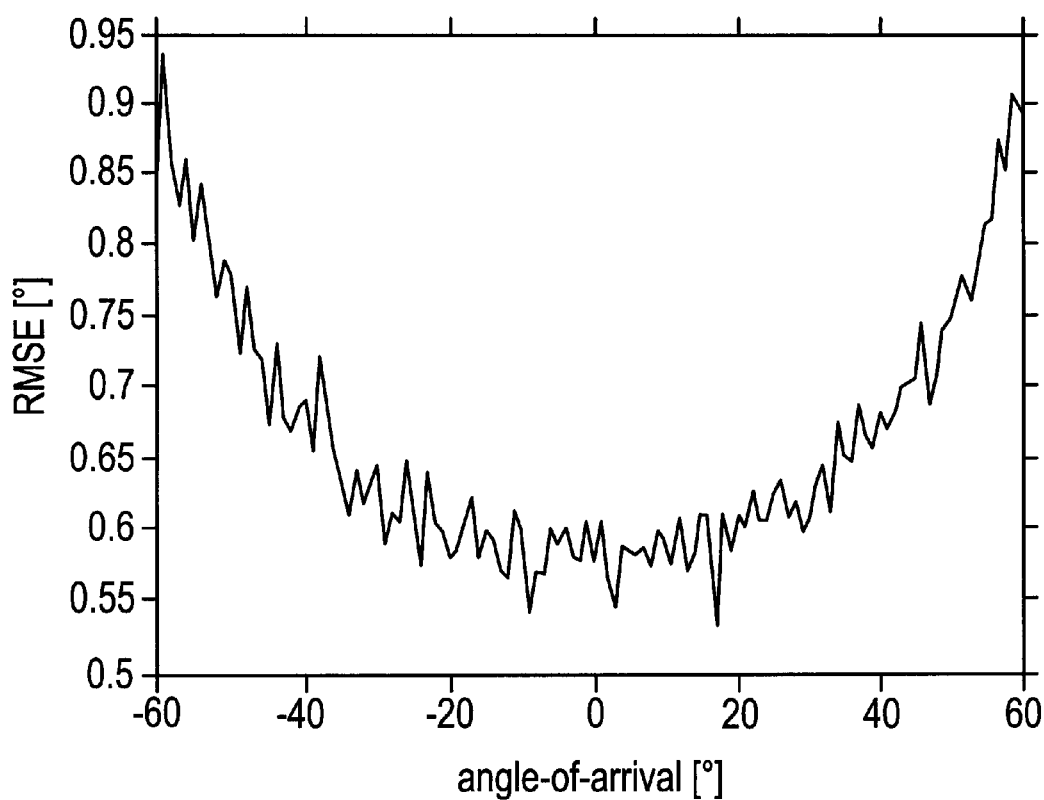
FIGS. 8 and 9 graphically illustrate simulation results associated with a least-squares angle of arrival estimation according to the invention.
Figure 9:
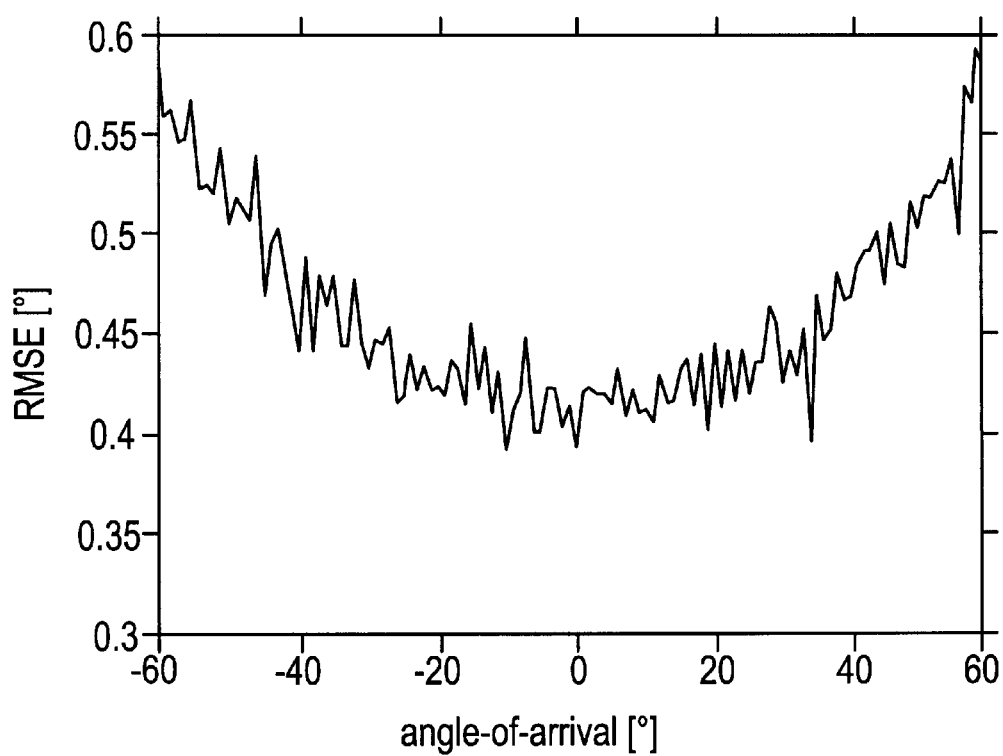

The results from the least-squares simulations are shown in FIGS. 8 and 9. The root mean-squared error (RMSE) is presented in degrees, defined by $$RMSE = \sqrt{\frac{1}{N}\sum_{n=1}^{N}(\theta - \hat{\theta}(n))^2} \qquad \text{Equation 19}$$

as a function of angle-of-arrival $\theta$ ($\hat{\theta}(n)$ denotes the nth estimate of $\theta$). The results are averaged over N=500 Monte Carlo simulations. The RMSE has two origins; first there will be a random error due to the noise. Furthermore, there will be a deterministic error due to the approximation in Equation 3. Indeed, according to the signal model, each spread source is modeled as a large number of point sources impinging on the array. These sources cannot be resolved by the array and an estimation error is the result. All the simulations use a uniform and linear array, ULA, with half wavelength spacing between the elements ($\Delta=\frac{1}{2}$).

FIGS. 8 and 9 show the results for M=4 and M=8 antenna sensors respectively, for an angular spread of 3° and a signal-to-noise ratio (SNR) of 10 dB. It can be seen that the RMSE becomes larger as the end fire direction is approached, but it never becomes very large in these examples. Also, the RMSE is smaller for the larger antenna array of FIG. 9.

Figure 10:
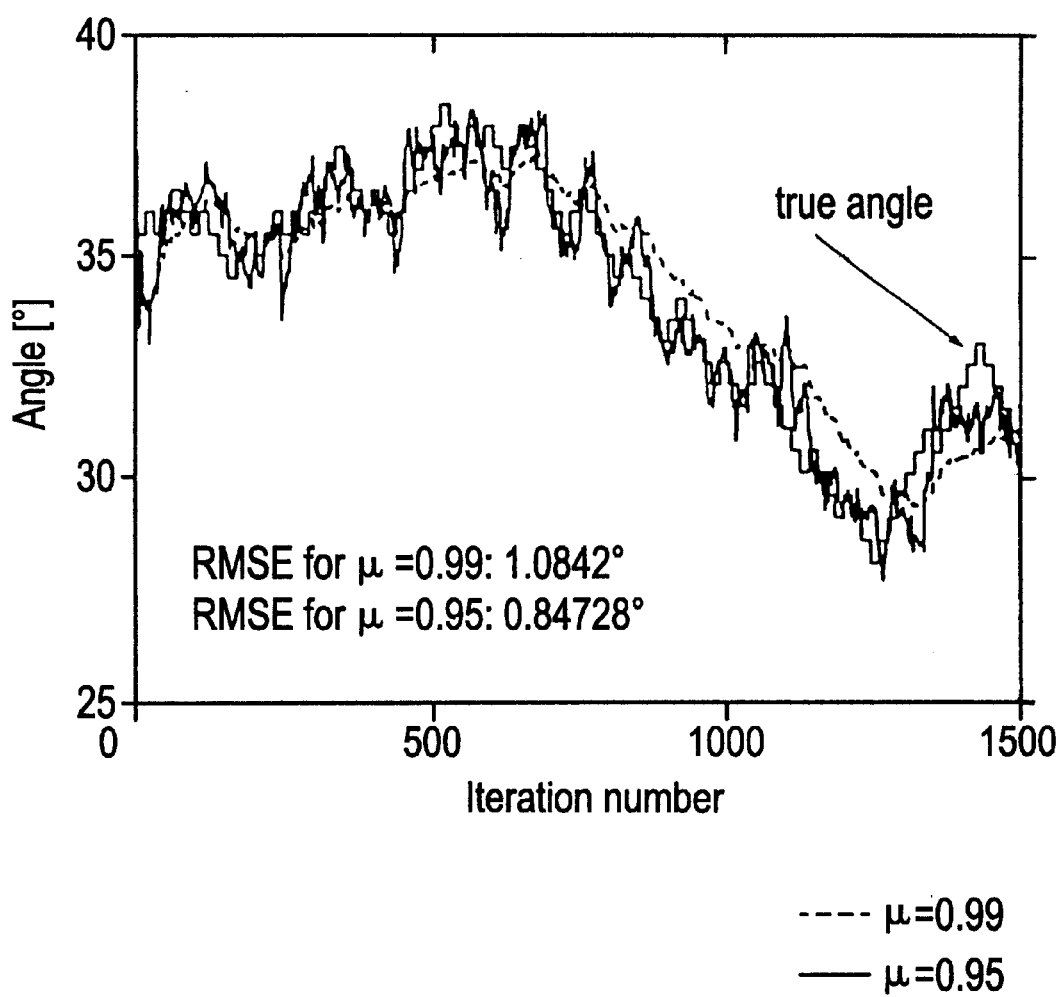
FIGS. 10 and 11 graphically illustrate simulation results associated with a recursive least-squares angle of arrival estimation according to the invention.
Figure 11:
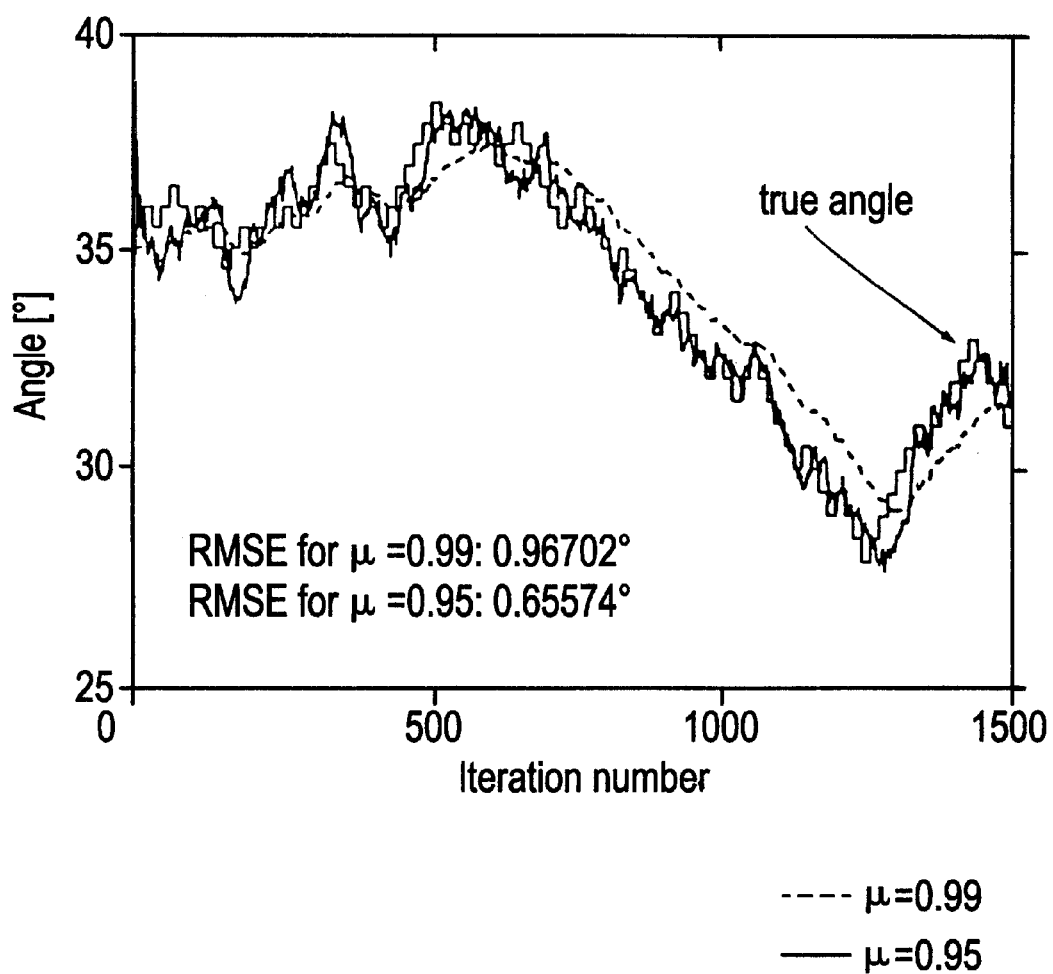

FIGS. 10 and 11 illustrate the ability of the RLS algorithm to track the AOA of a signal. The AOA is modeled to change every 15 samples (corresponding to the 15 slots in a WCDMA radio frame), according to the random walk model $$\theta(t)=\theta(t-1)+v(t) \qquad \text{Equation 20}$$

where v(t) is a random variable taking values ±0.5 degrees with equal probability. In reality, the AOAs of the fingers are expected to vary more continuously.

The results are shown in FIGS. 10 and 11 for M=4 and M=8 antenna elements respectively, for an angular spread of 3° and an SNR of 10 dB. Forgetting factors $\mu=0.95$ and $\mu=0.99$ are used. As expected, a lower value of $\mu$ allows for a better tracking of the AOA, at the price of a higher variance in the estimates. In any case, the RMSE is low; around one degree in the cases considered.

It will be evident to workers in the art that an angle of arrival estimator according to the present invention can be implemented by a suitably programmed data processing device such as a digital signal processor, or by such data processing device in combination with additional external components.

Although exemplary embodiments of the present invention have been described above in detail, this does not limit the scope of the invention, which can be practiced in a variety of embodiments.

What is claimed is:

1. A method of estimating an angle at which a multipath finger produced by a digital radio communication source arrives at an antenna array, comprising:

receiving the multipath finger at the antenna array, the multipath finger comprising a plurality of rays, and the antenna array comprising a plurality of sub-arrays;

obtaining an uplink weight vector associated with the multipath finger using the plurality of rays received by each of the plurality of sub-arrays; and calculating an estimate of the angle in response to the weight vector.

2. The method of claim 1, including extracting from the weight vector a plurality of sub-vectors respectively corresponding to the plurality of sub-arrays within the antenna array, said calculating step including calculating the estimate from the sub-vectors.

3. The method of claim 2, wherein said step of calculating the estimate from the sub-vectors includes using a least-squares approximation to calculate the estimate.

4. The method of claim 2, wherein said step of calculating the estimate from the sub-vectors includes using a recursive algorithm to calculate the estimate.

5. The method of claim 4, wherein said step of using a recursive algorithm includes using a recursive least-squares approximation to calculate the estimate.

6. The method of claim 1, wherein said receiving step includes receiving the multipath finger at an antenna array having a shift invariance structure.

7. The method of claim 6, wherein said receiving step includes receiving the multipath finger at a uniform and linear antenna array.

8. The method of claim 1, wherein the multipath finger is produced by a mobile telecommunication device operating in a cellular telecommunication network.

9. An apparatus for estimating an angle at which a multipath finger produced by a digital radio communication source arrives at an antenna array, comprising:

an input for receiving an uplink weight vector associated with the multipath finger, the multipath finger comprising a plurality of rays, the antenna array comprising a plurality of sub-arrays, and the uplink weight vector obtained using the plurality of rays received by each of the plurality of sub-arrays,; and an angle-of-arrival calculator coupled to said input for calculating an estimate of the angle in response to the weight vector.

10. The apparatus of claim 9, including an extractor coupled between said input and said angle-of-arrival calculator for extracting from the weight vector a plurality of sub-vectors respectively corresponding to the plurality of sub-arrays within the antenna array, said angle-of-arrival calculator operable for receiving said sub-vectors from said extractor and calculating therefrom the estimate.

11. The apparatus of claim 10, wherein said angle-of-arrival calculator is operable for using a least-squares approximation to calculate the estimate.

12. The apparatus of claim 10, wherein said angle-of-arrival calculator is operable for using a recursive algorithm to calculate the estimate.

13. The apparatus of claim 12, wherein said recursive algorithm is a recursive least-squares algorithm.

14. The apparatus of claim 9, wherein the antenna array has a shift invariance structure.

15. The apparatus of claim 14, wherein the antenna array is a uniform and linear array.

16. The apparatus of claim 9, wherein the digital radio communication source is a mobile telecommunication device operating in a cellular telecommunication network.

17. A digital radio communication apparatus, comprising:

an antenna array for receiving a multipath finger produced by a digital radio communication source, the multipath finger comprising a plurality of rays, and the antenna array comprising a plurality of sub-arrays;

a weight vector producer coupled to said antenna array for producing an uplink weight vector associated with the multipath finger using the plurality of rays received by each of the plurality of sub-arrays; and an angle-of-arrival calculator coupled to said weight vector producer for calculating, in response to the weight vector, an estimate of an angle at which the multipath finger has arrived at said antenna array, said angle-of-arrival calculator including an output coupled to said antenna array for controlling downlink operation of said antenna array based on the estimate.

18. The apparatus of claim 17, including an extractor coupled between said weight vector producer and said angle-of-arrival calculator for extracting from the weight vector a plurality of sub-vectors respectively corresponding to the plurality of sub-arrays within the antenna array, said angle-of-arrival calculator operable for receiving said sub-vectors from said extractor and calculating the estimate therefrom.

19. The apparatus of claim 18, wherein said angle-of-arrival calculator is operable for using a least-squares approximation to calculate the estimate.

20. The apparatus of claim 18, wherein said angle-of-arrival calculator is operable for using a recursive algorithm to calculate the estimate.

21. The apparatus of claim 20, wherein said recursive algorithm is a recursive least-squares algorithm.

22. The apparatus of claim 17, wherein said antenna array has a shift invariance structure.

23. The apparatus of claim 22, wherein said antenna array is a uniform and linear array.

24. The apparatus of claim 17, wherein said digital radio communication source is a mobile telecommunication device operating in a cellular telecommunication network.

* * * * *

UNITED STATES PATENT AND TRADEMARK OFFICE
CERTIFICATE OF CORRECTION

PATENT NO.   : 6,411,257 B1
DATED        : June 25, 2002
INVENTOR(S)  : Joakim Sorelius, Bo Göransson and Mats Cedervall It is certified that error appears in the above-identified patent and that said Letters Patent is hereby corrected as shown below:

<u>Column 3,</u>
Line 64, replace "$\theta - \theta_l$", insert -- $\theta - \theta_1$ --.

<u>Column 4,</u>
Line 36, replace "$a_2(\theta) = \epsilon^{i2n\Delta \sin \theta} a_1(\theta)$", insert -- $a_2(\theta) = \epsilon^{i2\pi\Delta \sin \theta} a_1(\theta)$ --.

Signed and Sealed this

Eighth Day of June, 2004

JON W. DUDAS
*Acting Director of the United States Patent and Trademark Office*